United States Patent
Jerichow et al.

(10) Patent No.: US 12,052,143 B2
(45) Date of Patent: Jul. 30, 2024

(54) SERVICE PROVISIONING TO FACILITATE ANALYSIS OF NETWORK FUNCTION BEHAVIOUR

(71) Applicant: Nokia Technologies Oy, Espoo (FI)

(72) Inventors: Anja Jerichow, Grafing bei München (DE); Chaitanya Aggarwal, Munich (DE); Jing Ping, Chengdu (CN); Iris Adam, Munich (DE); Konstantinos Samdanis, Munich (DE); Yannick Lair, Voisins le Bretonneux (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/040,087

(22) PCT Filed: Aug. 5, 2020

(86) PCT No.: PCT/CN2020/107172
§ 371 (c)(1),
(2) Date: Jan. 31, 2023

(87) PCT Pub. No.: WO2022/027342
PCT Pub. Date: Feb. 10, 2022

(65) Prior Publication Data
US 2023/0275810 A1 Aug. 31, 2023

(51) Int. Cl.
*H04L 41/14* (2022.01)
*H04L 43/04* (2022.01)
(52) U.S. Cl.
CPC .............. *H04L 41/14* (2013.01); *H04L 43/04* (2013.01)

(58) Field of Classification Search
CPC ... H04L 41/069; H04L 41/14; H04L 41/5058; H04L 43/04; H04L 43/10
See application file for complete search history.

(56) References Cited

U.S. PATENT DOCUMENTS

| | | | |
|---|---|---|---|
| 10,440,145 B1 * | 10/2019 | Torun | ...................... H04L 43/10 |
| 10,531,515 B1 | 1/2020 | Engelhart | |
| 2019/0238425 A1 | 8/2019 | Mladin et al. | |

(Continued)

FOREIGN PATENT DOCUMENTS

| | | |
|---|---|---|
| CN | 109391482 A | 2/2019 |
| CN | 110545195 A | 12/2019 |
| CN | 111263409 A | 6/2020 |

OTHER PUBLICATIONS

"3rd Generation Partnership Project; Technical Specification Group Services and System Aspects; Architecture enhancements for 5G System (5GS) to support network data analytics services (Release 16)", 3GPP TS 23.288, V16.3.0, Mar. 2020, pp. 1-62.

(Continued)

*Primary Examiner* — Gil H. Lee
(74) *Attorney, Agent, or Firm* — Barta Jones, PLLC

(57) ABSTRACT

Example embodiments of the present disclosure relate to devices, methods and computer readable storage media for service provisioning to facilitate analysis of a service from a network function (NF). In example embodiments, one or more logs are received from at least one of a first NF, a network repository function (NRF) and a service communication proxy (SCP). The one or more logs are associated with a service from a second NF. Further, analysis of provision of the service from the second NF is facilitated based on the one or more logs.

20 Claims, 5 Drawing Sheets

(56) References Cited

U.S. PATENT DOCUMENTS

2019/0394655 A1 12/2019 Rahman et al.
2022/0248316 A1* 8/2022 Castellanos Zamora ............... H04L 65/1073

OTHER PUBLICATIONS

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

"3rd Generation Partnership Project; Technical Specification Group Core Network and Terminals; 5G System; Network Data Analytics Services; Stage 3 (Release 16)", 3GPP TS 29.520, V16.3.0, Mar. 2020, pp. 1-83.

"3rd Generation Partnership Project; Technical Specification Group Services and System Aspects; Security architecture and procedures for 5G system (Release 16)", 3GPP TS 33.501, V16.2.0, Mar. 2020, pp. 1-227.

"Authentication in indirect communication scenarios", 3GPP TSG-SA3 Meeting #99e, S3-201382, Ericsson, May 11-15, 2020, pp. 1-5.

"Token-based authorization for indirect communication", 3GPP TSG-SA3 Meeting #99e, S3-201386, CableLabs, May 11-15, 2020, 5 pages.

"3rd Generation Partnership Project; Technical Specification Group Services and System Aspects; Vocabulary for 3GPP Specifications (Release 17)", 3GPP TR 21.905, V17.0.0, Jul. 2020, pp. 1-66.

International Search Report and Written Opinion received for corresponding Patent Cooperation Treaty Application No. PCT/CN2020/107172, dated May 6, 2021, 9 pages.

"Filtering and logging of alarms", 3GPP TSG SA WG5 (Telecom Management) Meeting #111, S5-171109, Agenda Item: 6.3, Ericsson, Jan. 16-20, 2017, 5 pages.

"Addition Assets and Threats for Generic NFs", 3GPP TSG-SA3 Meeting #95-bis, S3-192138, Nokia, Jun. 24-28, 2019, 14 pages.

Office Action received for corresponding Chinese Patent Application No. 202080105892.5, dated May 21, 2024, 12 pages of Office Action and no page of translation available.

* cited by examiner

SERVICE PROVISIONING TO FACILITATE ANALYSIS OF NETWORK FUNCTION BEHAVIOUR

RELATED APPLICATION

This application was originally filed as PCT Application No. PCT/CN2020/107172, filed on Aug. 5, 2020, which is incorporated herein by reference in its entirety.

FIELD

Example embodiments of the present disclosure generally relate to the field of communication, and in particular, to devices, methods and computer readable storage media for service provisioning to facilitate analysis of a service from a network function (NF).

BACKGROUND

A service-based architecture in 3rd Generation Partnership Project (3GPP) relies on a consumer-producer paradigm. A key function of the service-based architecture is a network repository function (NRF) that provides registration, discovery and authorization for a service from a network function (NF) to enable NFs to identify services from each other. For example, after a NF as a service consumer has discovered via a NRF a set of services from an NF as a service producer, the consumer may select a service from the producer and request an access token from the NRF for the selected service. The NRF may authorize the consumer and generate an access token to allow the consumer to request the service of the producer. Further, the consumer may use the access token to access the service from the producer directly or indirectly via a service communication proxy (SCP). However, there is no mechanism available to trace the activities of the consumer, the producer and/or the NRF.

SUMMARY

In general, example embodiments of the present disclosure provide devices, methods and computer readable storage media for service provisioning to facilitate analysis of a service from a network function (NF).

In a first aspect, a device is provided which comprises at least one processor and at least one memory including computer program code. The at least one memory and the computer program code are configured to, with the at least one processor, cause the device to receive one or more logs from at least one of a first network function, a network repository function and a service communication proxy. The one or more logs are associated with the service from the second network function. The device is further caused to facilitate analysis of provision of the service from the second network function based on the one or more logs.

In a second aspect, a device is provided at a first network function, which comprises at least one processor and at least one memory including computer program code. The at least one memory and the computer program code are configured to, with the at least one processor, cause the device to send at least one of a request for an access token to access a service from a second network function, or a request for the service. The device is further caused to generate a log to facilitate analysis of provision of the service from the second network function. The log is associated with the service from the second network function.

In a third aspect, a device is provided at a service communication proxy, which comprises at least one processor and at least one memory including computer program code. The at least one memory and the computer program code are configured to, with the at least one processor, cause the device to receive, from a first network function, a request for a service from a second network function. The device is further caused to generate a log to facilitate analysis of provision of the service from the second network function. The log is associated with the service from the second network function.

In a fourth aspect, a device is provided at a network repository function, which comprises at least one processor and at least one memory including computer program code. The at least one memory and the computer program code are configured to, with the at least one processor, cause the device to receive, from one of a first network function and a service communication proxy, a request for an access token to be used by the first network function to access a service from a second network function. The device is caused to send the access token to the one of the first network function and the service communication proxy. Further, the device is caused to generate a log to facilitate analysis of provision of the service from the second network function. The log is associated with the service from the second network function.

In a fifth aspect, a method is provided. In the method, one or more logs are received from at least one of a first network function, a network repository function and a service communication proxy. The one or more logs are associated with a service from a second network function. Further, analysis of provision of the service from the second network function is facilitated based on the one or more logs.

In a sixth aspect, a method implemented at a first network function is provided. In the method, at least one of a request for an access token to access a service from a second network function, or a request for the service is sent. Further, a log is generated to facilitate analysis of provision of the service from the second network function. The log is associated with the service from the second network function.

In a seventh aspect, a method implemented at a service communication proxy is provided. In the method, a request for a service from a second network function is received from a first network function. Further, a log is generated to facilitate analysis of provision of the service from the second network function. The log is associated with the service from the second network function.

In an eighth aspect, a method implemented at a network repository function is provided. In the method, a request for an access token to be used by the first network function to access a service from a second network function is received from one of a first network function and a service communication proxy. The access token is sent to the one of the first network function and the service communication proxy. Further, a log is generated to facilitate analysis of provision of the service from the second network function. The log is associated with the service from the second network function.

In a ninth aspect, there is provided an apparatus comprising means for performing the method according to the fifth, sixth, seventh or eighth aspect.

In a tenth aspect, there is provided a computer readable storage medium comprising program instructions stored thereon. The instructions, when executed by a processor of a device, cause the device to perform the method according to the fifth, sixth, seventh or eighth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1A:
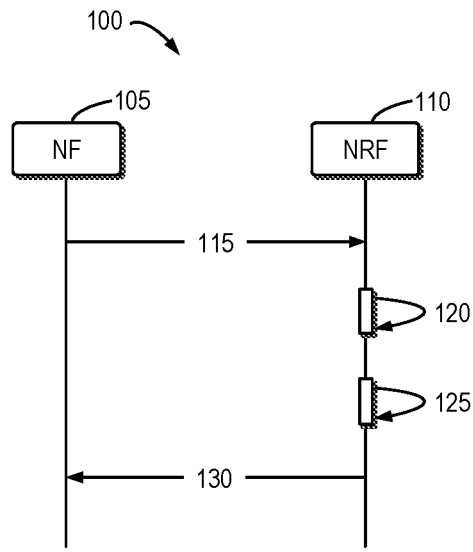
FIG. 1(a) illustrates a flow of an example process for an NF to obtaining an access token from an NRF.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network function" or "NF" refers to a physical, virtual or hybrid function or entity which is deployed at a network side and provides one or more services to clients. For example, an NF may be arranged at a device in an access network or a core network. The NF may be implemented in hardware, software, firmware, or some combination thereof.

As used herein, the term "circuitry" may refer to one or more or all of the following:
 (a) hardware-only circuit implementations (such as implementations in only analog and/or digital circuitry) and
 (b) combinations of hardware circuits and software, such as (as applicable): (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

In the service-based architecture in 3GPP, if an NF is intended to access a service from a further NF, the NF may request an access token from an NRF and further request the service from the further NF using the access token. An example service access process based on token verification will be discussed below with reference to FIGS. 1(a) and 1(b).

FIG. 1(a) shows a flow of an example process 100 for an NF 105 to obtaining an access token from an NRF 110.

In the process 100 as shown in FIG. 1(a), the NF 105 sends (115) to a NRF 120 a request for an access token to be used by the NF 105 to access a service from a further NF (not shown). For example, the request may be an Nnrf_AccessToken_Get Request, as defined in the 3GPP specification. The request may include one or more expected service names, an NF type of the NF 105 and/or the further NF, a client identity (or ID) and the like. The NRF 120 authorizes (120) a client and generates (125) an access token. The NRF 120 sends (130) the access token to the NF 105. For example, the NRF 120 may send an Nnrf_AccessToken_Get Response, as defined in the 3GPP specification. The response may include the access token and other parameters such as expiration time of the token.

Figure 1B:
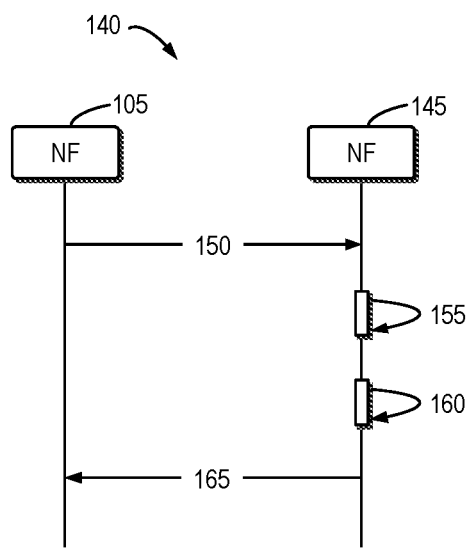
FIG. 1(b) illustrates a flow of an example process for an NF to access a service from a further NF.

FIG. 1(b) shows a flow of an example process 140 for the NF 105 to access a service from a further NF 145.

In the process 140 as shown in FIG. 1(b), the NF 105 sends (135) to the NF 145 a request for a service from the NF 145. The request for the service may include an access token. The NF 145 verifies (155) the access token. For example, the NF 145 may verify integrity of the access token and claims in the access token. If the verification is successful, the NF 145 executes (160) the requested service. The NF 145 sends (165) a response to the NF 105.

Several communication models are available to NF/NF service interaction. For example, an NF as a service consumer may communicate with an NF as a service producer directly or indirectly via a service communication proxy (SCP). Example communication models will be discussed below with reference to FIGS. 2(*a*)-2(*d*).

In a communication model 200 as shown in FIG. 2(*a*), the NFs 105 and 145 communicate with each other directly. For example, the NF 105 may be configured with NF profiles of the NF 145 to directly communicate with the NF 145. As shown in FIG. 2(*a*), the NF 105 sends (205) a service request to the NF 145 and receives (210) a service response from the NF 145. Further, the NF 105 sends (215) a subsequent service request to the NF 145.

In a communication model 220 as shown in FIG. 2(*b*), the NFs 105 and 145 can also communicate with each other directly. Different from the communication model 220 in FIG. 2(*a*), the communication model 220 involves the NRF 110 for NF discovery. As shown in FIG. 2(*b*), before sending (205) the service request to the NF 145, the NF 105 queries (225) the NRF 110 for NF discovery and receives (230) NF profiles from the NRF. Further, the NF 105 communicates with the NF 145 with the NF profiles.

In a communication model 235 as shown in FIG. 2(*c*) and a communication model 240 as shown in FIG. 2(*d*), the NF 105 does not communicate with the NF 145 directly, but communicates with the NF 145 indirectly via a SCP 245. In the communication model 235 as shown, after the NF 105 performs NF discovery with the NRF 110, the NF 105 sends (250) a service request to the SCP 245, and then the SCP 245 sends (255) the service request to the NF 145. After the SCP 245 receives (260) a service response from the NF 145, the SCP 245 sends (265) the service response to the NF 105. The NF 105 further sends (270) a subsequent service request to the SCP 245, and the SCP 245 sends (275) the subsequent service request to the NF 145.

Different from the communication model 235, in the communication model 240, the NF 105 does not perform NF discovery with the NRF 110. Instead, the NF 105 sends (280) to the SCP 245 a service request containing parameters required to find a suitable producer. The SCP 245 performs (285) NF discovery with the NRF 110 using the parameters. Then, the SCP 245 sends (290) a service request to the NF 145.

As mentioned above, the NRF 110 may provide an access token (or an authorization token) to the NF 105 to allow the NF 105 to access a service of the NF 145 as shown in FIGS. 1(*a*) and 1(*b*). However, there is no mechanism available to trace the activities of the NF(s) and/or NRF. For example, it cannot be analyzed or determined whether the token is possible to be used successfully.

In some cases, an NF as a service producer may be malicious and not providing a service, but has registered the service beforehand. Moreover, the NRF has granted authorization for the service. In these cases, an NF may be charged for an authorization token to access this service, but a service request from the NF using the authorization token may not be proceeded by the producer. Another possible situation is that the NF requests from NRF directly or indirectly via an SCP an access token (such as OAuth token) to access the service of another NF, but then the consumer NF will not use the token.

If the NF is denied to use the service, such a malicious NF may be identifiable or observed or checked. However, the following issues may be difficult to detect:

| | |
|---|---|
| A) | whether the NRF has provided a token, |
| B) | whether the NF has used the token that the producer provided |
| C) | whether the producer has behaved as expected, for example, whether the access token granted for using a service of this producer is finally allowing consumption of the service, and/or |
| D) | whether the NF replays a token, continuously uses an invalid token, and so on. |

Example embodiments of the present disclosure present a mechanism to analyzing provision of a service from a NF. This mechanism defines security logs and services that may be used for detection of a malicious NF, such as service provisioning by an NF that has been tampered with by the malicious NF. With this mechanism, a consumer of a service from an NF, an NRF and/or a SCP provides a log associated with the service to a device to facilitate analysis of the service provision. For example, the consumer or SCP may log whether it has received an access token from the NRF and whether a service from a NF is provided or denied. The NRF may log any request by the consumer or SCP. Based on the log, provision of the service from the NF is analyzed, for example, to determine whether service provisioning is successful or failed.

In this way, the provision of a specific service from a NF can be traced. For example, successful authorization for a consumer may be correlated with success or failure in service provisioning from a producer. As a result, a malicious NF may be detected, and therefore security may be improved in NF services.

Figure 3:
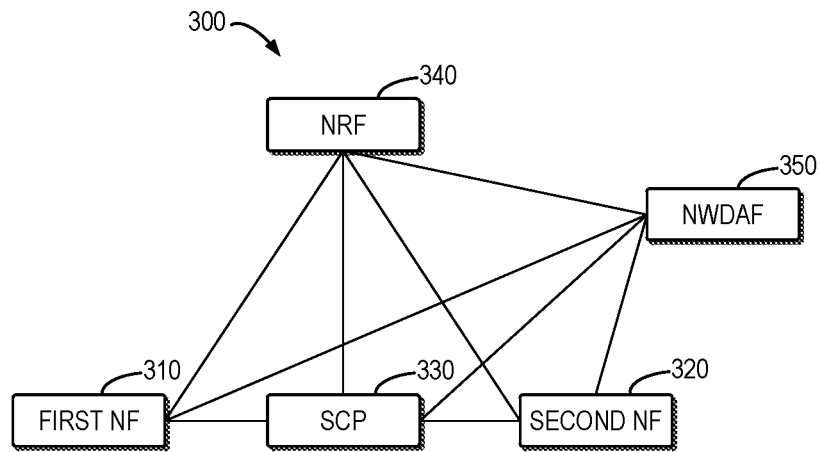
FIG. 3 illustrates an example environment in which example embodiments of the present disclosure can be implemented.

FIG. 3 shows an example environment 300 in which example embodiments of the present disclosure can be implemented.

The environment 300, which may be a part of a communication network, comprises two NFs 310 and 320 which are referred as a first NF 310 and a second NF 320, respectively. The two NFs 310 and 320 can provide one or more services to be accessed by other NFs. For example, the first NF 310 may act as a consumer of a service from the second NF 320, and vice versa.

The environment 300 further comprises a SCP 330 acting as an intermediate between the two NFs 310 and 320. The first and second NFs 310 and 320 can communication via the SCP 330. It may be also possible that the two NFs 310 and 320 directly communicate with each other in a direct communication mode similar to the communication models 200 and 220 as shown in FIGS. 2(*a*) and 2(*b*).

In the environment 300, an NRF 340 provides NF discovery and NF profile maintenance. For example, if the first NF 310 is to access a service from the second NF 320, the first NF 310 may perform NF discovery by querying the NRF 340, which is similar to the operations in the communication models 220 and 230 as shown in FIGS. 2(*b*) and 2(*c*). The first NF 310 may also send the parameters of NF discovery to the SCP 330, and then the SCP 330 performs NR discovery with the NRF 340, which is similar to the operations in the communication model 240 as shown in FIG. 2(*d*). In particular, the NRF 340 can provide an access token to the first NF 310 or the SCP 330 to allow the first NF 310 to access the service from the second NF 320.

It should be understood that the NF 310 or 320, the SCP or the NRF 340 may be implemented in any suitable physical or virtual function or entity at a network side in the communication network. The scope of the present disclosure will not be limited in this regard.

As shown in FIG. 3, the environment 300 further comprises a network data analytics function (NWDAF) 350 for collecting various data or information from the NF 310 or 320, the SCP or the NRF 340. In some embodiments of the present disclosure, the NWDAF 350 may get provisioned from the NF 310 or 320, the SCP and/or the NRF 340 with one or more logs associated with a service from a NF, including, for example, an identifier of a consumer, a producer, a service, a token, an NRF, an indication whether the service is provided successfully or not, and the like. Based on the log(s), service provision results can be analyzed to detect whether a service access is success or failed, for example.

It should be understood that the NWDAF 350 is shown in FIG. 3 only for the purpose of illustration, without suggesting any limitation. Any other suitable device may function as a device for collecting the log(s) to further facilitate analysis of the service provision. For example, the NF 310 or 320, the SCP, the NRF 340 or other devices (not shown) may serve as such a device.

Figure 4:
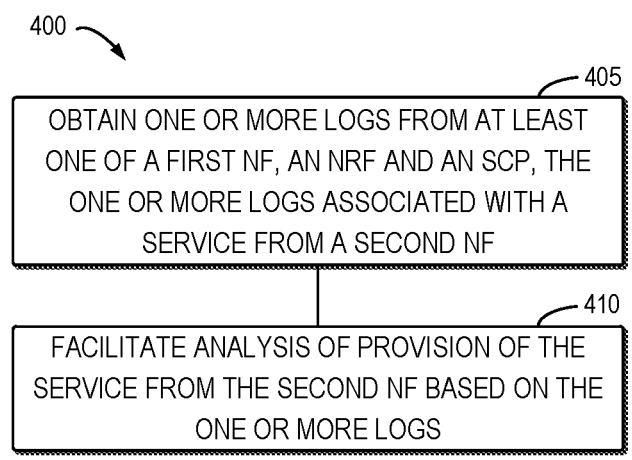
FIG. 4 illustrates a flowchart of an example method according to some example embodiments of the present disclosure.

FIG. 4 shows a flowchart of an example method 400 according to some example embodiments of the present disclosure.

The method 400 can be implemented at a device such as the NWDAF 350 as shown in FIG. 3 or any other suitable device that can collect logs to further analyze the service provision based on the collected logs, such as the NF 310 or 320, the SCP 330 or the NRF 340. For the purpose of discussion, the method 400 will be described with reference to FIG. 3 in the scenario that the first NF 310 is to access a service from the second NF 320. It should be understood that the method 400 is also applicable to the case that the second NF 320 is to access a service from the first NF 310.

At block 405, one or more logs associated with a service from the second NF 320 is received from at least one of the first NF 310, the SCP 330 and the NRF 340. The one or more logs may be received in any suitable way. For example, the logs may be obtained during a token request procedure and/or a service request procedure.

In some embodiments, the one or more logs may comprise at least one log that is generated upon a request to the NRF 340 for an access token to be used by the first NF 310 to access the service from the second NF 320. For example, the first NF 310 may send a request for an access token to the NRF 340. After receiving an access token from the NRF 340, the first NF 310 and/or the NRF 340 may generate one or more logs associated with the service. The logs may include an identifier of the first NF 310, an identifier of the second NF 320, an identifier of the NRF 340, an identifier of the service, a timestamp associated with the request for the access token, and/or an identifier of the access token.

As another example, the request for the access token may be sent by the SCP 330 to the NRF 340 after the SCP 330 receives a request for the service from the first NF 310. In this case, the SCP 330 and/or the NRF 340 may generate one or more logs associated with the service. Accordingly, the logs may be received from the first NF 310, the SCP 330 and/or the NRF 340.

In some example embodiments, the received one or more logs may comprise at least one log generated upon a request for the service from the second NF 320. For example, the first NF 310 may send a request for the service to the second NF 320 directly in the case that a direction communication model is enabled between the first and second NFs 310 and 320. After receiving a response from the second NF 320, the first NF 310 may generate a log associated with the service from the second NF 320. The log may include an identifier of the first NF 310, an identifier of the second NF 320, an identifier of the service, a timestamp associated with the request for the service, and/or an indication whether the service is provided by the second network function, for example.

If the service provision is failed due to malice of the second NF 320 or other reasons, the first NF 310 may also generate the log. For example, the log may be generated by the first NF 310 upon expiration of a predetermine time period after the request for the service, or upon other predetermined triggers.

In some example embodiments, the first NF 310 may send the request for the service along with an access token that is obtained from the NRF 340 in advance during a token request procedure. The request for the service and the access token may be sent together in any suitable way. The access token may be included in the request for the service. It may be also possible that the access token and the request for the service are sent separately. Accordingly, the second NF 320 may verify the access token. In these example embodiments, the log of the first NF 310 may further include an identifier of the NRF 340 and/or validity of the access token.

If a direct communication model is not allowed between the first and second NFs 310 and 320, the first NF 310 may send a request for the service to the SCP 330 that forwards it to the second NF 320. In some example embodiments, after receiving the request for the service, the SCP 330 may first send a request for an access token to the NFR 340 and generates the corresponding log associated with the service, as described above. After receiving the access token from the NRF 340, the SCP 330 further send to the second NF 320 the request for the service along with the access token obtained from the NFR 340. Alternatively or in addition, after receiving a response from the second NF 320, the SCP 330 may generate a log associated with the service from the second NF 320.

The log may include an identifier of the first NF 310, an identifier of the second NF 320, an identifier of the service, a timestamp associated with the request for the service, validity of an access token obtained from the NRF 340 to access the service, an identifier of the NRF, or an indication whether the service is provided by the second NF 320. In some example embodiments, the SCP 330 may further log a number of requests to access the service.

In the example embodiments where the request for the service is sent by the first NF 310 along with the access token, the SCP 330 may directly forwards the request for the service to the second NF 320. After receiving a response from the second NF 320, the SCP 330 may generate a log associated with the service from the second NF 320.

After the first NF 310, the SCP 330 and/or the NRF 340 generates the logs associated with the service from the NF 320, the first NF 310, the SCP 330 and/or the NRF 340 may report (for example, send or push) the log to a device, such as the NWDAF 350, to facilitate analysis of the service provision from the second NF 320.

In some example embodiments, the first NF 310, the SCP 330 and/or the NRF 340 may not report the log to the collecting device, but store the log locally or in a remote device such as a shared store or a further NF, SCP and/or NRF. Alternatively or in addition, the log may be collected by one or more of the first NF 310, the SCP 330 and/or the NRF 340 that reports a collection of the logs to the collecting device. The stored logs may be retrieved or pulled by the collecting device when needed.

As described above, one of the first NF 310, the SCP 330 and/or the NRF 340 may function as the collecting device. For example, in the case that the NRF 340 acts as the collecting device, the NRF 340 may receive the logs from the first NF 310 and/or the SCP 330 while obtaining its own log by reading it from a local storage.

In some example embodiments, a new service may be provided to enable the collecting device to receive from the first NF 310, the SCP 330 and/or the NRF 340 the one or more logs associated with a service from the second NF 320. Table 1 shows example definition of such a new service in the case that the NWDAF 350 is used for the log collection.

TABLE 1

| Service Name | Description |
|---|---|
| Nnwdaf_SecurityLog | This service enables an NF, an NRF or a SCP to report logs of authentication authorization requests and the successful usage of the requested service, or the NWDAF to retrieve such logs. |

In this example, as shown, the new service is named as Nnwdaf_SecurityLog. With this service, an NRF or a SCP can report logs of authentication authorization requests that include a token request and/or a service request, for example. This service can also enable the NWDAF to retrieve such logs initiatively.

After the one or more logs are received, at block 410, analysis of provision of the service from the second NF 320 is facilitated based on the logs. In some example embodiments, the analysis may be performed by the collecting device. In some other example embodiments, the analysis may be performed by any other suitable devices. For example, the collecting device may send or report the collected logs to a dedicated analysis device such as a dedicated NWDAF to facilitate the analysis of service provision at the analysis device.

For example, it may be detected whether the service is provided from the second NF 320 successfully or not. Accordingly, any malicious activity from the second NF 320 may be detected. This could trigger alerts to an operator that is managing the second NF 320.

The logs collected from the various devices such as the first NF 310, the SCP 330 and the NRF 340 may be maintained at the collecting device in any suitable way. An example information model for recording the log is shown as below.

suitable data type, such as Timestamp, Varchar, Boolean and the like, as shown in Table 1.

The field of Timestamp may record a timestamp reported by the NF, NRF and/or SCP, or a time when the log is obtained from the NF, NRF and/or SCP. The field of Consumer ID may record an identifier (ID) of a consumer of a service from an NF. The field of Producer ID may record an identifier of a producer providing the service. The field of Service ID (Authenticated) may record an identifier of a service that has been authenticated to the consumer. The field of Token ID may record an identifier of an access token or an authentication token. The field of Token Validity may indicate whether the access token is valid or not. The field of Service ID (Provided) may record an identifier of a service that has been provided to the consumer. The field of Number of Requests for Service Access may record the number of requests for access the requested service. The field of Service ID (Requested) may record an identifier of a service that has been requested by the consumer.

It is to be understood that the information model as described above is only an example. Any suitable type of information may be collected from any of an NF, SCP and/or NRF and recorded in a suitable information model.

Using the information or data recorded in the information model, the provision of the service from an NF may be analyzed. As such, the service provision may be traced and detected. As a result, a NF that has tampered its service may be detected, and therefore security may be improved in NF services.

Figure 5:
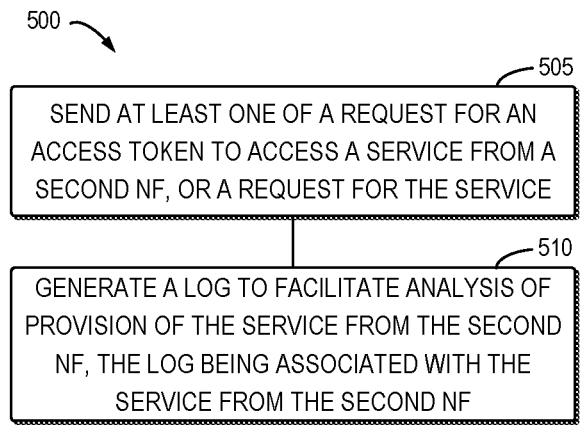
FIG. 5 illustrates a flowchart of an example method according to some example embodiments of the present disclosure.

FIG. 5 shows a flowchart of an example method 500 according to some example embodiments of the present disclosure. The method 500 can be implemented at the first NF 310 in the case that the first NF 310 requests a service from the second NF 320 or at the second NF 320 in the case that the second NF 320 requests a service from the first NF 310. For the purpose of discussion, the method 500 will be described with reference to FIG. 3 in the case that the first NF 310 is to access a service from the second NF 320.

Figure 2A:
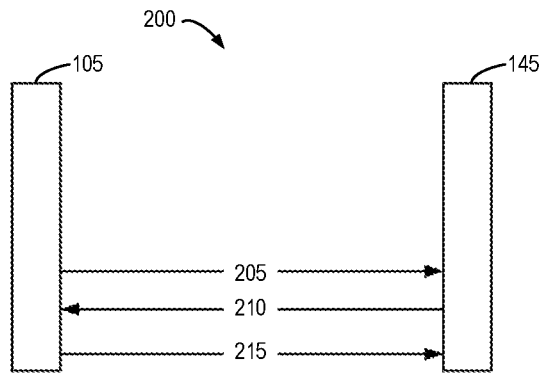
FIGS. 2(a)-2(d) illustrate example communication models between NFs.
Figure 2B:
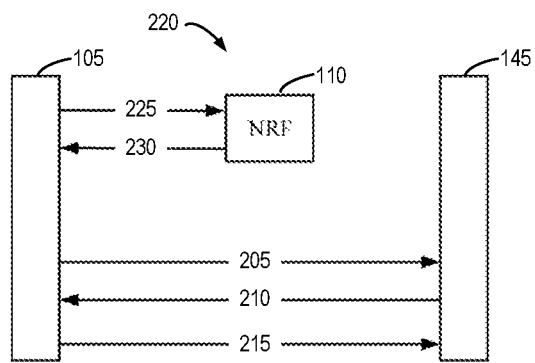
Figure 2C:
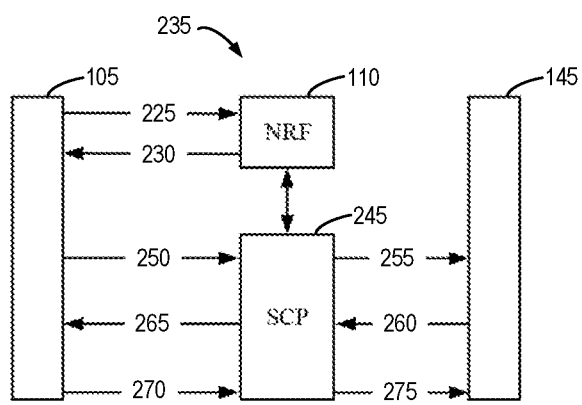

At block 505, the first NF 310 sends at least one of a request for an access token to access a service from a second network function, or a request for the service. For example, in a communication model similar to the communication models 220 and 235 as shown in FIGS. 2(b) and 2(c), the first NF 310 may send a request for the access token to the NRF 340. In a communication model similar to the communication models 200 and 220 as shown in FIGS. 2(a) and 2(b), the first NF 310 may send a request for the service to the second NF 320, while in the communication models 210 and 215, the first NF 310 may send a request for the service to the SCP 330.

| | | | | | Fields | | | | |
|---|---|---|---|---|---|---|---|---|---|
| | | Timestamp | Consumer ID | Producer ID | Service ID (Authenticated) | Token ID | Token Validity | Service ID (Provided) | Number of Requests for Service Access | Service ID (Requested) |
| Data Source | NF/NRF/SCP | NRF | NRF | NRF/SCP | NF/SCP | NF/SCP | NF/SCP | SCP | NF/SCP/NRF |
| Data Type | TIMESTAMP | Varchar | Varchar | Boolean | Boolean | Boolean | Boolean | Integer | Varchar |

The information model may include several fields such as Timestamp, Consumer ID, Producer ID, Service ID (Authenticated), Token ID, Token Validity, Service ID (Provided), Number of Requests for Service Access, Service ID (Requested), sourced from an NF, NRF and/or SCP, for example, as shown. These fields may be implemented in any Upon the request for the access token and/or the request for the service, at block 510, the first NF 310 generates a log associated with the service from the second NF 320. The first NF 310 may report the log to a device, such as the NWDAF 350, to facilitate analysis of provision of the service from the second NF 320. Alternatively or in addition, the log may be stored at the first NF 320, and the collecting device may retrieve or pull the log when needed.

The log may be generated by the first NF 310 during a token request procedure and/or a service request procedure. For example, after sending a request for an access token to the NRF 340, the first NF 310 may generate the log upon reception of the access token from the NRF 340. The log may include any suitable information. For example, the log may include an identifier of the first NF 310, an identifier of the second NF 320, an identifier of the NRF 340, an identifier of the service, a timestamp associated with the request for the access token, and/or an identifier of the access token.

Figure 2D:
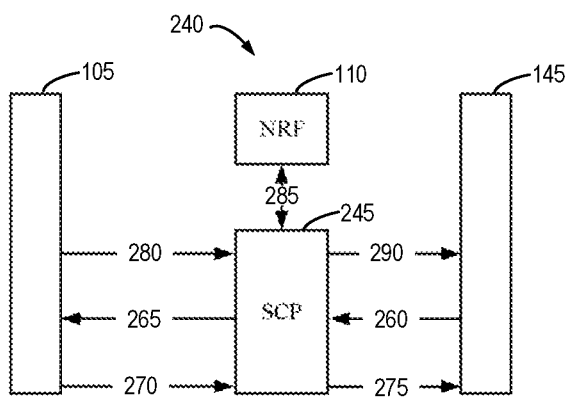

As another example, the first NF 310 may generate the log after sending the request for the service to the SCP 330 in a communication model similar to the communication model 235 or 240 as shown in FIG. 2(c) or 2(d) or to the second NF 310 in a communication model similar to the communication model 200 or 220 as shown in FIG. 2(a) or 2(b). In this example, the log may include an identifier of the first NF 310, an identifier of the second NF 320, an identifier of the service, a timestamp associated with the request for the service, and/or an indication whether the service is provided by the second network function. In the case that an access token obtained from the NRF is sent by the first NF 310 along with the request for the service, the second NF 320 may valid the access token. Accordingly, the log may further comprise validity of the access token. Alternatively or in addition, the log may include an identifier of the NRF 340.

Figure 6:
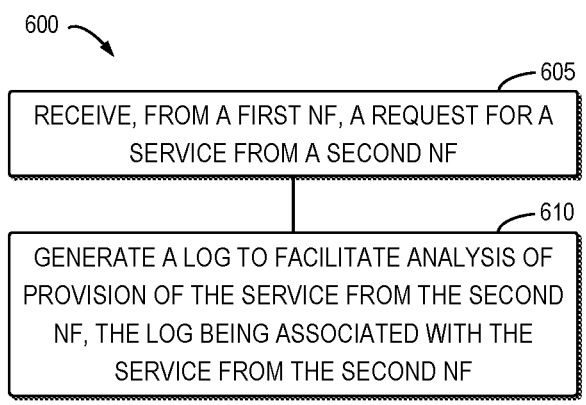
FIG. 6 illustrates a flowchart of an example method according to some example embodiments of the present disclosure.

FIG. 6 shows a flowchart of an example method 600 according to some example embodiments of the present disclosure. The method 600 can be implemented at the SCP 330 as shown in FIG. 3. For the purpose of discussion, the method 600 will be described with reference to FIG. 3 in the scenario that the first NF 310 is to access a service from the second NF 320.

At block 605, the SCP 330 receives, from the first NF 310, a request for a service from the second NF 320. For example, in a communication model similar to the communication model 235 or 240 as shown in FIG. 2(c) or 2(d), the SCP 330 may receive the request for the service from the first NF 310.

Upon reception of the request for the service, at block 610, the SCP 330 generates a log associated with the service from the second NF 320 for use by a device such as the NWDAF 350 to facilitate analysis of provision of the service from the second NF 320. The log may be generated after the SCP 330 forwards the request for the service to the second NF 320. For example, if the request for the service is received from the first NF 310 along with an access token obtained from the NRF 340, the SCP 330 may send to the second NF 320 the request for the service along with the access token. Further, the SCP 330 may generate a log including an identifier of the first NF 310, an identifier of the second NF 320, an identifier of the NRF 340, an identifier of the service, a timestamp associated with the request for the service, a number of requests to access the service, validity of the access token, or an indication whether the service is provided by the second NF 320.

If the SCP 330 receives from the first NF 310 only the request for the service without the access token, the SCP 330 may send to the NRF 340 a request for an access token to access the service. After receiving the access token from the NRF 340, the SCP 330 generates the log including, for example, an identifier of the first NF 310, an identifier of the second NF 320, an identifier of the NRF 340, an identifier of the service, a timestamp associated with the request for the access token, and/or an identifier of the access token.

In some example embodiments, the SCP 330 reports (for example, send or push) the log to a device for analyzing the provision of the service from the second NF 320. Alternatively or in addition, the SCP 330 may store the log for the analyzing device to retrieve or pull when needed.

Figure 7:
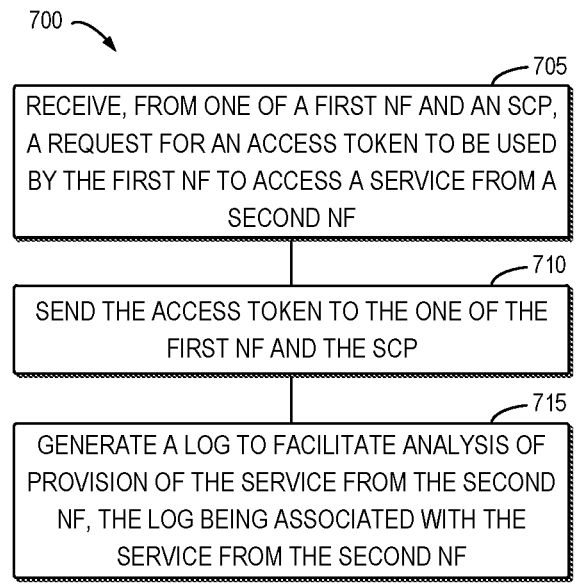
FIG. 7 illustrates a flowchart of an example method according to some example embodiments of the present disclosure.

FIG. 7 shows a flowchart of an example method 700 according to some example embodiments of the present disclosure. The method 700 can be implemented at the NRF 340 as shown in FIG. 3. For the purpose of discussion, the method 700 will be described with reference to FIG. 3 in the scenario that the first NF 310 is to access a service from the second NF 320.

At block 705, the NRF 340 receives, from the first NF 310 or the SCP 330, a request for an access token to be used by the first NF 310 to access a service from the second NF 320. For example, in a communication model similar to the communication model 220 or 235 as shown in FIG. 2(b) or 2(c), the NRF 340 may receive a request for an access token from the first NF 310. In a communication model similar to the communication model 240 as shown in FIG. 2(d), the NRF 340 may receive a request for the access token from the SCP 330.

At block 710, the NRF 340 sends the access token to the first NF 310 or the SCP 330, accordingly. At block 715, the NRF 340 generates a log associated with the service from the second NF 320. The log may include an identifier of the first NF 310, an identifier of the second NF 320, an identifier of the NRF 340, an identifier of the service, a timestamp associated with the request for the access token, and/or an identifier of the access token, for example.

In some example embodiments, the log may be reported (for example, send or push) by the NRF 340 to a device, such as the NWDAF 350, for analyzing the provision of the service from the second NF 320. Alternatively or in addition, the log may be stored by the NRF 340 for the analyzing device to retrieve or pull when needed.

All operations and features as described above with reference to FIGS. 1-4 are likewise applicable to the methods 500, 600 and 700 and have similar effects. For the purpose of simplification, the details will be omitted.

Figure 8:
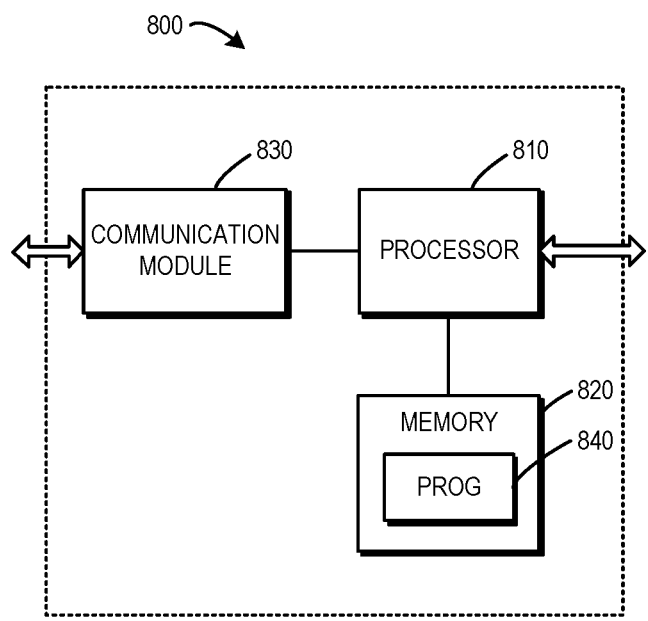
FIG. 8 illustrates a simplified block diagram of an apparatus that is suitable for implementing example embodiments of the present disclosure.

FIG. 8 is a simplified block diagram of a device 800 that is suitable for implementing example embodiments of the present disclosure. The device 800 can be implemented at or as a part of the first or second NF 310 or 320, the SCP 330, the NRF 340, a device such as the NWDAF 350 to facilitate analysis of provision of the service from an NF.

As shown, the device 800 includes a processor 810, a memory 820 coupled to the processor 810, a communication module 830 coupled to the processor 810, and a communication interface (not shown) coupled to the communication module 830. The memory 820 stores at least a program 840. The communication module 830 is for bidirectional communications, for example, via multiple antennas or via a cable. The communication interface may represent any interface that is necessary for communication.

The program 840 is assumed to include program instructions that, when executed by the associated processor 810, enable the device 800 to operate in accordance with the example embodiments of the present disclosure, as discussed herein with reference to FIGS. 1 to 7. The example embodiments herein may be implemented by computer software executable by the processor 810 of the device 800, or by hardware, or by a combination of software and hardware. The processor 810 may be configured to implement various example embodiments of the present disclosure.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

When the device 800 acts as the collecting device such as the NWDAF 350, the processor 810 may implement the operations or acts of the collecting device as described above with reference to FIGS. 1-4. When the device 800 acts as the first or second NF 310 or 320, the processor 810 may implement the operations or acts of the first NF 310 as described above with reference to FIGS. 1-5. When the device 800 acts as the SCP 330, the processor 810 may implement the operations or acts of the SCP 330 as described above with reference to FIGS. 1-6. When the device 800 acts as the NRF 340, the processor 810 may implement the operations or acts of the NRF 340 as described above with reference to FIGS. 1-7.

All operations and features as described above with reference to FIGS. 1 to 7 are likewise applicable to the device 800 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the operations and acts as described above with reference to FIGS. 1 to 7. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a device comprises: at least one processor; and at least one memory including computer program code; the at least one memory and the computer program code configured to, with the at least one processor, cause the device to: obtain one or more logs from at least one of a first network function, a network repository function and a service communication proxy, the one or more logs being associated with a service from a second network function; and facilitate analysis of provision of the service from the second network function based on the one or more logs.

In some example embodiments, the one or more logs comprise at least one log generated by at least one of the first network function, the network repository function and the service communication proxy upon a request to the network repository function for an access token to be used by the first network function to access the service, the at least one log comprising at least one of: an identifier of the first network function, an identifier of the second network function, an identifier of the network repository function, an identifier of the service, a timestamp associated with the request for the access token, or an identifier of the access token.

In some example embodiments, the one or more logs comprise a log generated by the first network function after sending a request for the service to the service communication proxy or the second network function, the log comprising: an identifier of the first network function, an identifier of the second network function, an identifier of the service, a timestamp associated with the request for the service, validity of an access token obtained from the network repository function to access the service, an identifier of the network repository function, or an indication whether the service is provided by the second network function.

In some example embodiments, the one or more logs comprise a log generated by the service communication proxy after receiving, from the first network function, a request for the service, the log comprising at least one of: an identifier of the first network function, an identifier of the second network function, an identifier of the service, a timestamp associated with the request for the service, a number of requests to access the service, validity of an access token obtained from the network repository function to access the service, an identifier of the network repository function, or an indication whether the service is provided by the second network function.

In some example embodiments, the device comprises a function able of collecting the one or more logs.

In some aspects, a device comprises: at least one processor; and at least one memory including computer program code; the at least one memory and the computer program code configured to, with the at least one processor, cause the device to: send, by a first network function, at least one of a request for an access token to access a service from a second network function, or a request for the service; and generate, by the first network function, a log to facilitate analysis of provision of the service from the second network function, the log being associated with the service from the second network function.

In some example embodiments, the device is caused to send the at least one of the request for the access token or the request for the service by: sending the request for the access token to a network repository function; and the device is caused to generate the log by: receiving the access token from a network repository function, and generating the log comprising at least one of: an identifier of the first network function, an identifier of the second network function, an identifier of the network repository function, an identifier of the service, a timestamp associated with the request for the access token, or an identifier of the access token.

In some example embodiments, the device is caused to send the at least one of the request for the access token or the request for the service by: sending the request for the service to a service communication proxy or the second network function; and the device is caused to generate the log by: generating the log comprising at least one of: an identifier of the first network function, an identifier of the second network function, an identifier of the service, a timestamp associated with the request for the service, validity of an access token obtained from a network repository function to access the service, an identifier of the network repository function, or an indication whether the service is provided by the second network function.

In some example embodiments, the device is further caused to: send, by the first network function, the log to a device for the analysis of the provision of the service from the second network function.

In some aspects, a device comprises: at least one processor; and at least one memory including computer program code; the at least one memory and the computer program code configured to, with the at least one processor, cause the device to: receive from a first network function, a request for a service from a second network function; and generate a log to facilitate analysis of provision of the service from the second network function, the log being associated with the service from the second network function.

In some example embodiments, the device is caused to generate the log by: sending, to a network repository function, a request for an access token to access the service; receiving the access token from network repository function; and generating the log comprising at least one of: an identifier of the first network function, an identifier of the second network function, an identifier of the network repository function, an identifier of the service, a timestamp associated with the request for the access token, or an identifier of the access token.

In some example embodiments, the device is caused to receive the request for the service by: receiving, from the first network function, the request for the service along with an access token obtained from a network repository function to access the service; and the device is caused to generate the log by: sending, to the second network function, the request for the service along with the access token; and generating the log comprising at least one of: an identifier of the first network function, an identifier of the second network function, an identifier of the network repository function, an identifier of the service, a timestamp associated with the request for the service, a number of requests to access the service, validity of the access token, or an indication whether the service is provided by the second network function.

In some example embodiments, the device is further caused to: send the log to a device for the analysis of the provision of the service from the second network function.

In some aspects, a device comprises: at least one processor; and at least one memory including computer program code; the at least one memory and the computer program code configured to, with the at least one processor, cause the device to: receive, by a network repository function, from one of a first network function and a service communication proxy, a request for an access token to be used by the first network function to access a service from a second network function; send, by the network repository function, the access token to the one of the first network function and the service communication proxy; and generate, by the network repository function, a log to facilitate analysis of provision of the service from the second network function, the log being associated with the service from the second network function.

In some example embodiments, the log comprises at least one of: an identifier of the first network function, an identifier of the second network function, an identifier of the network repository function, an identifier of the service, a timestamp associated with the request for the access token, or an identifier of the access token.

In some example embodiments, the device is further caused to: send, by the network repository function, the log to a device for the analysis of the provision of the service from the second network function.

In some aspects, a method comprises: receiving one or more logs from at least one of a first network function, a network repository function and a service communication proxy, the one or more logs being associated with a service from a second network function; and facilitate analysis of the service from the second network function based on the one or more logs.

In some example embodiments, the one or more logs comprise at least one log generated by at least one of the first network function, the network repository function and the service communication proxy upon a request to the network repository function for an access token to be used by the first network function to access the service, the at least one log comprising at least one of: an identifier of the first network function, an identifier of the second network function, an identifier of the network repository function, an identifier of the service, a timestamp associated with the request for the access token, or an identifier of the access token.

In some example embodiments, the one or more logs comprise a log generated by the first network function after sending a request for the service to the service communication proxy or the second network function, the log comprising: an identifier of the first network function, an identifier of the second network function, an identifier of the service, a timestamp associated with the request for the service, validity of an access token obtained from the network repository function to access the service, an identifier of the network repository function, or an indication whether the service is provided by the second network function.

In some example embodiments, the one or more logs comprise a log generated by the service communication proxy after receiving, from the first network function, a request for the service, the log comprising at least one of: an identifier of the first network function, an identifier of the second network function, an identifier of the service, a timestamp associated with the request for the service, a number of requests to access the service, validity of an access token obtained from the network repository function to access the service, an identifier of the network repository function, or an indication whether the service is provided by the second network function.

In some example embodiments, the method is implemented at a function able of collecting the one or more logs.

In some aspects, a method implemented at a first network function comprises: sending at least one of a request for an access token to access a service from a second network function, or a request for the service; and generating a log to facilitate analysis of provision of the service from the second network function, the log being associated with the service from the second network function.

In some example embodiments, sending the at least one of the request for the access token or the request for the service comprises: sending the request for the access token to a network repository function; and generating the log comprises: receiving the access token from a network repository function, and generating the log comprising at least one of: an identifier of the first network function, an identifier of the second network function, an identifier of the network repository function, an identifier of the service, a timestamp associated with the request for the access token, or an identifier of the access token.

In some example embodiments, sending the at least one of the request for the access token or the request for the service comprises: sending the request for the service to a service communication proxy or the second network function; and generating the log comprises: generating the log comprising at least one of: an identifier of the first network function, an identifier of the second network function, an identifier of the service, a timestamp associated with the request for the service, validity of an access token obtained from a network repository function to access the service, an identifier of the network repository function, or an indication whether the service is provided by the second network function.

In some example embodiments, the method further comprises: sending the log to a device for the analysis of the provision of the service from the second network function.

In some aspects, a method implemented at a service communication proxy comprises: receiving, from a first network function, a request for a service from a second network function; and generating a log to facilitate analysis of provision of the service from the second network function, the log being associated with the service from the second network function.

In some example embodiments, generating the log comprises: sending, to a network repository function, a request for an access token to access the service; receiving the access token from network repository function; and generating the log comprising at least one of: an identifier of the first network function, an identifier of the second network function, an identifier of the network repository function, an identifier of the service, a timestamp associated with the request for the access token, or an identifier of the access token.

In some example embodiments, receiving the request for the service comprises: receiving, from the first network function, the request for the service along with an access token obtained from a network repository function to access the service; and generating the log comprises: sending, to the second network function, the request for the service along with the access token; and generating the log comprising at least one of: an identifier of the first network function, an identifier of the second network function, an identifier of the network repository function, an identifier of the service, a timestamp associated with the request for the service, a number of requests to access the service, validity of the access token, or an indication whether the service is provided by the second network function.

In some example embodiments, the method further comprises: sending the log to a device for the analysis of the provision of the service from the second network function.

In some aspects, a method implemented at a network repository function comprises: receiving, from one of a first network function and a service communication proxy, a request for an access token to be used by the first network function to access a service from a second network function; sending the access token to the one of the first network function and the service communication proxy; and generating a log to facilitate analysis of provision of the service from the second network function, the log being associated with the service from the second network function.

In some example embodiments, the log comprises at least one of: an identifier of the first network function, an identifier of the second network function, an identifier of the network repository function, an identifier of the service, a timestamp associated with the request for the access token, or an identifier of the access token.

In some example embodiments, the method further comprises: sending the log to a device for the analysis of the provision of the service from the second network function.

In some aspects, an apparatus comprises: means for receiving one or more logs from at least one of a first network function, a network repository function and a service communication proxy, the one or more logs being associated with a service from a second network function; and means for facilitating analysis of the service from the second network function based on the one or more logs.

In some example embodiments, the one or more logs comprise at least one log generated by at least one of the first network function, the network repository function and the service communication proxy upon a request to the network repository function for an access token to be used by the first network function to access the service, the at least one log comprising at least one of: an identifier of the first network function, an identifier of the second network function, an identifier of the network repository function, an identifier of the service, a timestamp associated with the request for the access token, or an identifier of the access token.

In some example embodiments, the one or more logs comprise a log generated by the first network function after sending a request for the service to the service communication proxy or the second network function, the log comprising: an identifier of the first network function, an identifier of the second network function, an identifier of the service, a timestamp associated with the request for the service, validity of an access token obtained from the network repository function to access the service, an identifier of the network repository function, or an indication whether the service is provided by the second network function.

In some example embodiments, the one or more logs comprise a log generated by the service communication proxy after receiving, from the first network function, a request for the service, the log comprising at least one of: an identifier of the first network function, an identifier of the second network function, an identifier of the service, a timestamp associated with the request for the service, a number of requests to access the service, validity of an access token obtained from the network repository function to access the service, an identifier of the network repository function, or an indication whether the service is provided by the second network function.

In some example embodiments, the apparatus is implemented at a function able of collecting the one or more logs.

In some aspects, an apparatus implemented at a first network function comprises: means for sending at least one of a request for an access token to access a service from a second network function, or a request for the service; and means for generating a log to facilitate analysis of provision of the service from the second network function, the log being associated with the service from the second network function.

In some example embodiments, the means for sending the at least one of the request for the access token or the request for the service comprises: means for sending the request for the access token to a network repository function; and the means for generating the log comprises: means for receiving the access token from a network repository function, and means for generating the log comprising at least one of: an identifier of the first network function, an identifier of the network repository function, an identifier of the service, a timestamp associated with the request for the access token, or an identifier of the access token.

In some example embodiments, the means for sending the at least one of the request for the access token or the request for the service comprises: means for sending the request for the service to a service communication proxy or the second network function; and the means for generating the log comprises: means for generating the log comprising at least one of: an identifier of the first network function, an identifier of the second network function, an identifier of the service, a timestamp associated with the request for the service, validity of an access token obtained from a network repository function to access the service, an identifier of the network repository function, or an indication whether the service is provided by the second network function.

In some example embodiments, the apparatus further comprises: means for sending the log to a device to facilitate the analysis of the provision of the service from the second network function.

In some aspects, an apparatus implemented at a service communication proxy comprises: means for receiving, from a first network function, a request for a service from a second network function; and means for generating a log to facilitate analysis of provision of the service from the second network function, the log being associated with the service from the second network function.

In some example embodiments, the means for generating the log comprises: means for sending, to a network repository function, a request for an access token to access the service; means for receiving the access token from network repository function; and means for generating the log comprising at least one of: an identifier of the first network function, an identifier of the second network function, an identifier of the network repository function, an identifier of the service, a timestamp associated with the request for the access token, or an identifier of the access token.

In some example embodiments, the means for receiving the request for the service comprises: means for receiving, from the first network function, the request for the service along with an access token obtained from a network repository function to access the service; and the means for generating the log comprises: means for sending, to the second network function, the request for the service along with the access token; and means for generating the log comprising at least one of: an identifier of the first network function, an identifier of the second network function, an identifier of the network repository function, an identifier of the service, a timestamp associated with the request for the service, a number of requests to access the service, validity of the access token, or an indication whether the service is provided by the second network function.

In some example embodiments, the apparatus further comprises: means for sending the log to a device to facilitate the analysis of the provision of the service from the second network function.

In some aspects, an apparatus implemented at a network repository function comprises: means for receiving, from one of a first network function and a service communication proxy, a request for an access token to be used by the first network function to access a service from a second network function; means for sending the access token to the one of the first network function and the service communication proxy; and means for generating a log to facilitate analysis of provision of the service from the second network function, the log being associated with the service from the second network function.

In some example embodiments, the log comprises at least one of: an identifier of the first network function, an identifier of the second network function, an identifier of the network repository function, an identifier of the service, a timestamp associated with the request for the access token, or an identifier of the access token.

In some example embodiments, the apparatus further comprises: means for sending the log to a device to facilitate the analysis of the provision of the service from the second network function.

In some aspects, a computer readable storage medium comprises program instructions stored thereon, the instructions, when executed by a processor of a device, causing the device to perform the method according to some example embodiments of the present disclosure.

What is claimed is:

1. A device, comprising:
at least one processor; and
at least one memory storing instructions that, when executed by the at least one processor, cause the device at least to:
receive a plurality of logs from at least one of a first network function, a network repository function and a service communication proxy, the plurality of logs being associated with a service from a second network function, wherein the plurality of logs comprises logs generated by at least one of the first network function, the network repository function and the service communication proxy upon a request to the network repository function for an access token to be used by the first network function to access the service, the plurality of logs comprising the following:
an identifier of the first network function,
an identifier of the second network function,
an identifier of the network repository function,
an identifier of the service,
a timestamp associated with the request for the access token, and
an identifier of the access token; and
facilitate analysis of provision of the service from the second network function based on the plurality of logs.

2. The device of claim 1, wherein the plurality of logs further comprise a timestamp associated with the request for the service.

3. The device of claim 2, wherein the plurality of logs further comprise:
validity of an access token obtained from the network repository function to access the service,
an identifier of the network repository function, and
an indication whether the service is provided by the second network function.

4. The device of claim 1, wherein the plurality of logs comprise:
a timestamp associated with the request for the service,
a number of requests to access the service,
validity of an access token obtained from the network repository function to access the service,
and
an indication whether the service is provided by the second network function.

5. The device of claim 1, wherein the device comprises a function able of collecting the plurality of logs.

6. A device, comprising:
at least one processor; and
at least one memory storing instructions that, when executed by the at least one processor, cause the device at least to:
send, by a first network function, at least one of a request for an access token to access a service from a second network function, or a request for the service by sending the request for the access token to a network repository function; and
the device is caused to generate the log by:
receiving the access token from a network repository function
generate, by the first network function, a log to facilitate analysis of provision of the service from the second network function, the log being associated with the service from the second network function;
wherein the log comprises:
an identifier of the first network function,
an identifier of the second network function,
an identifier of the network repository function,
an identifier of the service,
a timestamp associated with the request for the access token, and
an identifier of the access token.

7. The device of claim 6, wherein the log further comprises validity of an access token obtained from a network repository function to access the service.

8. The device of claim 7, wherein the log further comprises: an identifier of the network repository function, and an indication whether the service is provided by the second network function.

9. The device of claim 6, wherein the device is further caused to:
send, by the first network function, the log to a device to facilitate the analysis of the provision of the service from the second network function.

10. A method comprising:
receiving one or more logs from at least one of a first network function, a network repository function and a service communication proxy, the one or more logs being associated with a service from a second network function; and
facilitating analysis of provision of the service from the second network function based on the one or more logs;
wherein the one or more logs comprise a log generated by the first network function after sending a request for the service to the service communication proxy or the second network function, the log comprising:
an identifier of the first network function,
an identifier of the second network function,
an identifier of the service,
a timestamp associated with the request for the service,
validity of an access token obtained from the network repository function to access the service,
an identifier of the network repository function, and
an indication whether the service is provided by the second network function.

11. The method of claim 10, wherein the one or more logs comprise at least one log generated by at least one of the first network function, the network repository function and the service communication proxy upon a request to the network repository function for an access token to be used by the first network function to access the service, the at least one log comprising a timestamp associated with the request for the access token.

12. The method of claim 10, wherein the one or more logs comprise at least one log generated by at least one of the first network function, the network repository function and the service communication proxy upon a request to the network repository function for an access token to be used by the first network function to access the service, the at least one log comprising a timestamp associated with the request for the access token, and an identifier of the access token.

13. The method of claim 10, wherein the one or more logs comprise a log generated by the service communication proxy after receiving, from the first network function, a request for the service, the log comprising a number of requests to access the service.

14. The method of claim 10, wherein the method is implemented at a function able of collecting the one or more logs.

15. The method of claim 10, further comprising, based on the one more logs, determine the service from the second network function is successful.

16. The method of claim 10, further comprising, based on the one more logs, determine the service from the second network function has failed.

17. The device of claim 1, wherein the at least one memory stores further instructions that, when executed by the at least one processor, cause the device at least to, based on the one more logs, determine the service from the second network function is successful.

18. The device of claim 1, wherein the at least one memory stores further instructions that, when executed by the at least one processor, cause the device at least to, based on the one more logs, determine the service from the second network function has failed.

19. The device of claim 6, wherein the at least one memory stores further instructions that, when executed by the at least one processor, cause the device at least to, based on the one more logs, determine the service from the second network function is successful.

20. The device of claim 6, wherein the at least one memory stores further instructions that, when executed by the at least one processor, cause the device at least to, based on the one more logs, determine the service from the second network function has failed.

\* \* \* \* \*